(12) United States Patent
Lin et al.

(10) Patent No.: US 10,781,578 B2
(45) Date of Patent: Sep. 22, 2020

(54) WATER SEPARATOR WITH SHOWER SEAT

(71) Applicant: FUJIAN XIHE SANITARY WARE TECHNOLOGY CO., LTD., Nan'an (CN)

(72) Inventors: Xiaofa Lin, Nan'an (CN); Xiaoshan Lin, Nan'an (CN); Qiqiao Liu, Nan'an (CN); Xiaoqing Deng, Nan'an (CN); Jun Xu, Nan'an (CN); Jianhui Gao, Nan'an (CN)

(73) Assignee: FUJIAN XIHE SANITARY WARE TECHNOLOGY CO., LTD., Nan'an (CN)

( * ) Notice: Subject to any disclaimer, the term of this patent is extended or adjusted under 35 U.S.C. 154(b) by 204 days.

(21) Appl. No.: 15/674,530

(22) Filed: Aug. 11, 2017

(65) Prior Publication Data

US 2018/0282983 A1  Oct. 4, 2018

(30) Foreign Application Priority Data

Mar. 29, 2017  (CN) .................... 2017 2 0324843 U

(51) Int. Cl.
*E03C 1/02*  (2006.01)
*E03C 1/06*  (2006.01)
(Continued)

(52) U.S. Cl.
CPC .............. *E03C 1/023* (2013.01); *E03C 1/025* (2013.01); *E03C 1/06* (2013.01); *F16K 11/074* (2013.01);
(Continued)

(58) Field of Classification Search
CPC .......... E03C 1/021; E03C 1/023; E03C 1/025; E03C 1/06; F16K 11/074; F16K 11/0743;
(Continued)

(56) References Cited

U.S. PATENT DOCUMENTS 5,265,287 A * 11/1993 Henkin ..................... E03C 1/06
4/596
6,042,560 A * 3/2000 Niederberger ...... A61M 1/0031
604/73

(Continued)

FOREIGN PATENT DOCUMENTS

WO  WO-2016106693 A1 * 7/2016 ............... B05B 1/16

*Primary Examiner* — Hailey K. Do
(74) *Attorney, Agent, or Firm* — JCIPRNET

(57) ABSTRACT

A water separator with a shower seat includes a valve body, a frictional unit, a shower seat, and a water outflow switching mechanism. The valve body is provided with a plurality of snap-fit joints disposed circumferentially. The frictional unit is mounted on the valve body and an outer wall thereof is provided with a first frictional surface. The shower seat is provided with a connecting chamber having an open end, and a snap-fit surface and a second frictional surface are circumferentially disposed in the connecting chamber, respectively. The water outflow switching mechanism is mounted in the valve body. Hook heads of the snap-fit joints are snapped to the snap-fit surface to prevent the shower seat from getting separated from the valve body. When the shower seat rotates with respect to the valve body, the first frictional surface and the second frictional surface rotate accordingly and interact with each other.

10 Claims, 18 Drawing Sheets

(51) Int. Cl.
*F16K 11/074* (2006.01)
*F16L 37/084* (2006.01)
*F16K 11/085* (2006.01)

(52) U.S. Cl.
CPC ...... *F16K 11/0856* (2013.01); *F16L 37/0847* (2013.01)

(58) Field of Classification Search
CPC ..... F16K 3/06; F16K 3/08; F16K 5/06; F16K 5/0605; F16K 31/60; Y10T 137/86517; Y10T 137/86549
See application file for complete search history.

(56) References Cited

U.S. PATENT DOCUMENTS

| | | | | |
|---|---|---|---|---|
| 7,373,954 B2 * | 5/2008 | Zhadanov | ........... | F16K 11/0853 137/625.47 |
| 8,616,470 B2 * | 12/2013 | Williams | .............. | E03C 1/0409 137/801 |
| 2008/0022450 A1 * | 1/2008 | Tsai | ........................ | E03C 1/023 4/570 |

* cited by examiner

A-A

B-B

C-C

WATER SEPARATOR WITH SHOWER SEAT

CROSS REFERENCE TO RELATED APPLICATIONS

This application is based upon and claims priority to Chinese Application No. 201720324843.6, filed on Mar. 29, 2017, the entire contents of which are incorporated herein by reference.

TECHNICAL FIELD

The present invention relates to the field of sanitation technology, more particularly, to a water separator with a shower seat.

BACKGROUND OF THE INVENTION

In currently available water separators with shower seat, the connection of the shower seat and the valve body is achieved by the following steps: providing a threaded hole on the valve body while providing a through hole in the clamping groove of the shower seat, passing a screw through the through hole of the shower seat, and locking it in the threaded hole of valve body such that the shower seat is fixed to the valve body. The rotational function of the shower seat is achieved by screwing or unscrewing the screw. When used over a long time, the connection between the shower seat and the valve body may get loose due to loosening of screw. Meanwhile, rigid friction is adopted in the traditional shower seat to stop the rotation of the shower seat. Since the rigid friction is likely to cause the reduction of frictional strength, thus reducing the rotational torque of the shower seat. Due to this, problems such that the connection of the shower seat is unreliable, the shower seat or the shower get loose or even fallen and so on may occur. Additionally, the switching and blocking component adopted in water outflow switching mechanism in the structure of the commonly used water separator is usually disposed at the outlet such that the adjusting force required by the switching and blocking component during the switching operation is relatively large. Therefore, the operation is inconvenient.

SUMMARY OF THE INVENTION

The objective of the present invention is to solve the problems existing in the prior art. A water separator with shower seat is provided. The shower seat is snapped to the water separating valve through snap-fit joints such that the traditional structure in which shower seat is screwed to the water separating valve is avoided. Therefore, the potential problem of loose connection due to loosening of the screw during the rotation of the shower seat is solved. The manner for stopping the rotation of the shower seat has been changed from rigid friction to elastic tooth friction. Therefore, the shower seat is not prone to wear after long-time rotation, such that the rotating torque of the shower seat will not decrease even after long-time use and the reliability of connection and rotation of the shower seat is ensured. The adjusting force required to drive the valve core to rotate is relatively small, thus, the water separating operation can be easily achieved.

In order to achieve above objectives, the present invention employs the following technical solutions.

A water separator with a shower seat comprises a valve body provided with a plurality of snap-fit joints disposed circumferentially, a frictional unit mounted on the valve body and provided on an outer wall thereof with a first frictional surface, a shower seat provided with a connecting chamber having an open end, and a water outflow switching mechanism mounted in the valve body, wherein the connecting chamber is provided with a snap-fit surface disposed circumferentially and a second frictional surface disposed circumferentially; hook heads of the snap-fit joints are snapped to the snap-fit surface to prevent the shower seat from getting separated from the valve body. The first frictional surface and the second frictional surface rotate accordingly and interact with each other when the shower seat rotates with respect to the valve body.

Further, the valve body is provided with a rotation-stopping block. The frictional unit is provided with a rotation-stopping groove corresponding to the rotation-stopping block, and the rotation-stopping block is inserted in the rotation-stopping groove to prevent the frictional unit from rotating with respect to the valve body.

Further, a snap-fit ring is fixed in the connecting chamber of the shower seat, and an upper end surface of the snap-fit ring forms the snap-fit surface.

Further, an outer wall of the frictional unit is provided with a first tooth-like protrusion and a tooth crest of the first tooth-like protrusion forms the first frictional surface, an inner wall of the connecting chamber of the shower seat is provided with a first tooth-like recess and a tooth crest of the first tooth-like recess forms the second frictional surface; the frictional unit is provided with a hollow structure such that the tooth crest of the first tooth-like protrusion deforms radially when the shower seat rotates with respect to the valve body so as to facilitate the rotation of and the interaction between the first frictional surface and the second frictional surface; and the first tooth-like protrusion engages with the first tooth-like recess when the shower seat rotates in place.

Further, the frictional unit includes a fixing ring and at least two C-shape elastic elements distributed on a peripheral surface of the fixing ring at an even interval with two ends thereof fixed to the peripheral surface of the fixing ring; the first tooth-like protrusion is disposed on a periphery of the elastic element; hook heads of the snap-fit joints disposed circumferentially are disposed outwardly; the rotation-stopping block is disposed on an outer periphery of the snap-fit joints and the rotation-stopping groove is provided on the fixing ring, wherein the rotation-stopping block on the outer periphery of the snap-fit joints is received in the rotation-stopping groove of the fixing ring, such that the frictional unit is connected to the valve body.

Further, the outer wall of the frictional unit is provided with more than two second tooth-like protrusions circumferentially disposed on a peripheral surface of the frictional unit at an even interval, and tooth crests of the second tooth-like protrusions form the first frictional surface; a frictional unit receiving groove is provided in the connecting chamber of the shower seat; an inner wall of the frictional unit receiving groove is provided with a second tooth-like recess and tooth crests of the second tooth-like recess form the second frictional surface. The tooth crests of the second tooth-like recess rotate with respect to the tooth crests of second tooth-like protrusion, when the shower seat rotates with respect to the valve body; the second tooth-like recess engages with the second tooth-like protrusion, when the shower seat rotates in place; hook heads of the snap-fit joints disposed circumferentially are disposed inwardly; the snap-fit ring is fixed to an outer wall or an open end of the frictional unit receiving groove and forms a step together with the outer wall of the frictional unit receiving groove; a step surface of the step forms the snap-fit surface; and the snap-fit joints are snapped to the snap-fit surface on the periphery of the frictional unit receiving groove such that the shower seat is connected to the valve body.

Further, each of the snap-fit joints is provided with a reinforcing rib located on a side that is opposite to the hook head.

Further, the snap-fit joints and the frictional unit are integrated with the valve body respectively.

Further, a wall of the valve body is provided with at least one water outlet; the water outflow switching mechanism includes a water separating body provided thereon with at least one water separating hole corresponding to the water outlet of the valve body, a valve core rotatably mounted on the water separating body and provided with a leather cup hole, a leather cup, and an elastic member, wherein the water separating body is mounted in the valve body and a closed water cavity is formed between the water separating body and the valve body; the leather cup and the elastic member are mounted in the leather cup hole; one end of the elastic member pushes against the leather cup such that the leather cup presses against a surface where a water inflow end of each water separating hole locates; and the valve core is driven to rotate such that the leather cup is switched to alternately block the water separating hole.

The water separator with a shower seat further comprises a water inflow mechanism, wherein the water inflow mechanism comprises a connecting unit fixedly connected to and communicated with the water inlet, a flow limiter mounted in the connecting unit, and a filter element mounted at a water inflow end of the connecting unit; the wall of the valve body is provided with a water inlet.

As compared to the prior art, the present invention has following advantages.

(1) In the present invention, since the shower seat is snapped on the valve body, the connection between the shower seat and the valve body is improved as compared to conventional structure, where the shower seat and the valve body were locked to each other by screw. Thus, the risk of detachment, dropping, etc., of shower due to loosening of the screw during the rotation of the shower seat is avoided.

(2) By using the rotation-stopping block fixed to the valve body and the rotation-stopping groove disposed on the frictional unit to determine the relative position between the frictional unit and the valve body and prevent the circumferential rotation of the frictional unit with respect to the valve body, the anti-rotation of the frictional unit with respect to the valve body is achieved by a simple structure. Therefore, the assembly is simple and easy to realize.

(3) The snap-fit surface of the shower seat is formed by the upper surface of the snap-fit ring fixed in the connecting chamber, and the snap-fit ring and the shower seat are separate structures such that the manufacturing process of the shower seat is much easier and the demolding is easily achieved in the molding process of the shower seat. Furthermore, the structure of the snap-fit surface is simple and reliable.

(4) The rotational fit between the first tooth-like protrusion and the first tooth-like recess is used to achieve frictional rotation between the shower seat and the valve body such that the user can apparently feel the shift. The conventional structure, in which the rotation is stopped by rigid friction, is avoided. Since the frictional unit is provided with a hollow structure that enables the first tooth-like protrusion to radially deform during rotation, when the shower seat rotates with respect to the valve body, no large external force is required. Therefore, the operation is more convenient.

(5) Since the "C" shape peripheral surface of the elastic element has a certain ability of deformation, the shower seat does not wear easily even after long time rotation to ensure that the rotating torque of the shower seat will not decrease even after long-time use and ensure the effectiveness and convenience of the rotation and anti-rotation of the shower seat. The connection of the fixing ring to the valve body is simple and easy to achieve.

(6) The rotational fit between the second tooth-like protrusion and the second tooth-like recess is used to achieve frictional rotation between the shower seat and the valve body, such that the user can apparently feel the shift. The conventional structure, in which the rotation is stopped by rigid friction, is avoided. Therefore, the operation is more convenient. The rotating torque of the shower seat will not decrease during long-time use.

(7) The frictional unit receiving groove is provided in the connecting chamber of the shower seat and the frictional unit is mounted in the frictional unit receiving groove such that the stability of the frictional unit during the rotation of the shower seat is improved. Therefore, the connection is more reliable.

(8) The configuration of the reinforcing rib increases the structural strength and stability, avoiding the risk that the shower seat or the shower may get loose or dropped due to the insufficient strength of the snap-fit joints when the shower is suspended on the shower seat and water outflows of the shower.

(9) The snap-fit joints and the frictional unit are integrated with the valve body, ensuring the stability of the snap-fit joints and the frictional unit, such that the strength of the installation structure of the shower seat is guaranteed. The following situation is avoided, i.e., after the shower seat is connected to the valve body, the suspension and water outflow of the shower may cause the detachment of the snap-fit joints from the valve body, thus making the connection unreliable.

(10) In the water outflow switching mechanism, the rotation of the valve core drives the leather cup to switch and block the water separating hole respectively. During the switching of water flow, all water separating holes will not be blocked at the same time, ensuring the stability of the inner water pressure of the valve body.

(11) In the water outflow switching mechanism, the water outflow switching function is achieved in a rotational manner. The rotational movement of the valve core is tangential to the direction of the water flow. The water outflow does not pass through the leather cup. Therefore, the force required for switching the water outflow is relatively small and the operation is relatively convenient.

(12) In the water outflow switching mechanism, the valve core is driven to rotate, the leather cup is linked to rotate and block or open the water separating hole alternately, thus the linkage structure is simple.

(13) In the water inflow mechanism, the flow limiter is adopted to ensure the water saving performance of the water separator. The filter element is provided at the water inflow end of the connecting unit to remove the impurities in water. Therefore, the quality of water flow is ensured, further avoiding the impurities in water from blocking the water outlet of the water separator or affecting the performance of other components.

BRIEF DESCRIPTION OF THE DRAWINGS

The illustrative drawings are used to provide a further understanding of the present invention and constitute a part of the present invention. The illustrative embodiments of the present invention and their description are used to explain the present invention and does not limit the present invention. In the drawings.

DETAILED DESCRIPTION OF THE INVENTION

Figure 1:
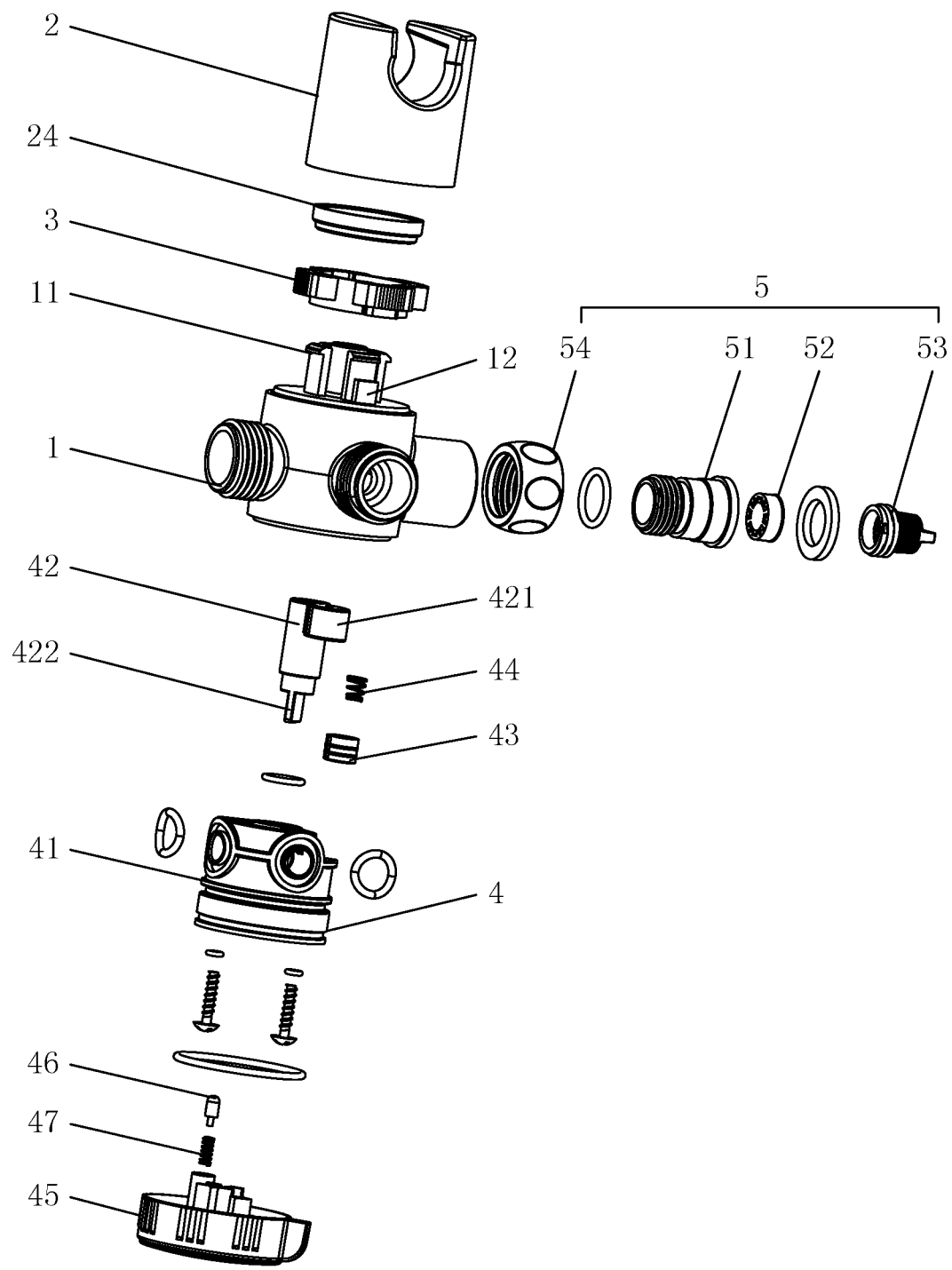
FIG. 1 is a perspective exploded structural diagram of the water separator with shower seat of the present invention.
Figure 2:
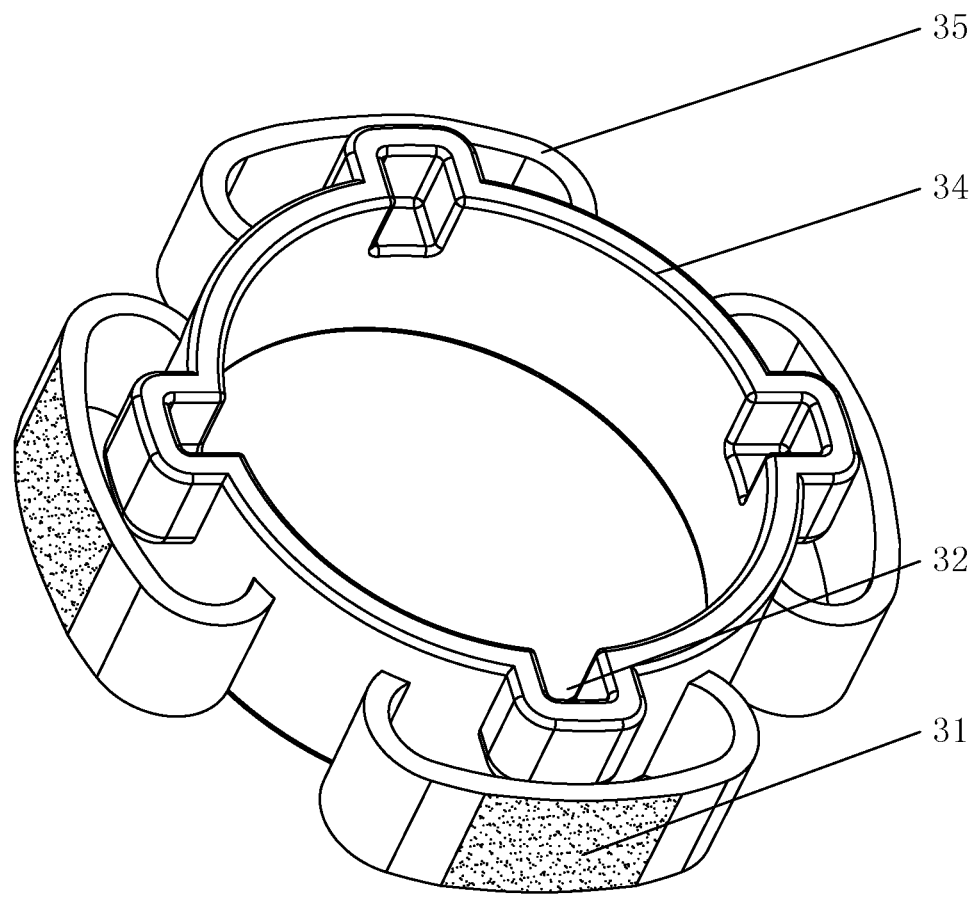
FIG. 2 is a structural diagram of the frictional unit of the embodiment of the present invention.
Figure 3:
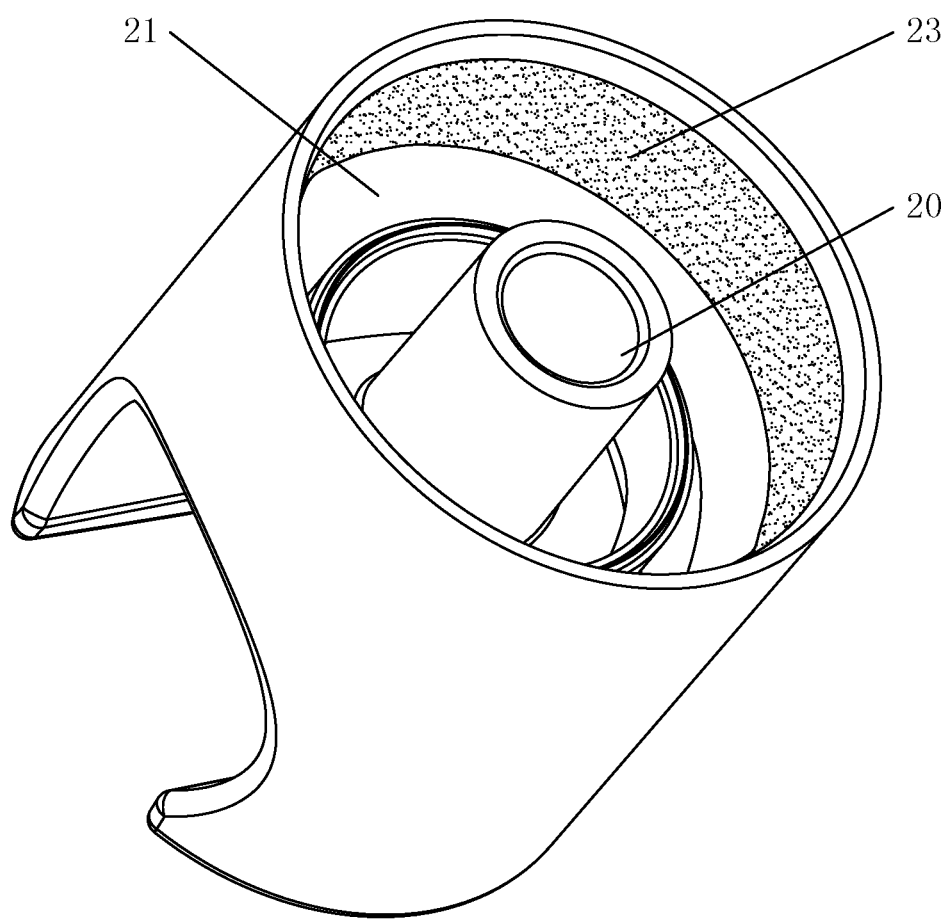
FIG. 3 is a structural diagram of the shower seat of the embodiment of the present invention.

In order to make the technical problems solved by the present invention, the technical solutions and the advantages clear and understandable, the present invention is described in further detail with reference to the accompanying drawings and embodiments. It should be noted that the specific embodiments described herein are merely illustrative of the present invention and are not intended to limit the present invention.

Referring FIG. 1 to FIG. 18, a water separator with a shower seat includes a valve body 1, a shower seat 2, a frictional unit 3, a water outflow switching mechanism 4, and a water inflow mechanism 5.

Snap-fit joints 11 and rotation-stopping blocks 12 are circumferentially disposed on the valve body 1. The shower seat 2 is provided with a connecting chamber 21 having an open end. A snap-fit surface 22 and a second frictional surface 23 are circumferentially disposed in the connecting chamber 21. The frictional unit 3 is mounted on the valve body 1 and provided with a first frictional surface 31 on the outer wall thereof and rotation-stopping grooves 32 corresponding to the rotation-stopping blocks 12. Rotation-stopping blocks 12 of the valve body 1 are inserted in rotation-stopping grooves 32 to restrict the rotation of the frictional unit 3 with respect to the valve body 1. Hook heads of snap-fit joints 11 of the valve body 1 are snapped to the snap-fit surface 22 to prevent the shower seat 2 from being separated from the valve body 1. The water outflow switching mechanism 4 and the water inflow mechanism 5 are mounted on the valve body 1.

Particularly, a snap-fit ring 24 is fixedly mounted in the connecting chamber 21 of the shower seat 2 and the upper end surface of the snap-fit ring 24 forms the snap-fit surface 22.

Embodiment 1

Figure 4:
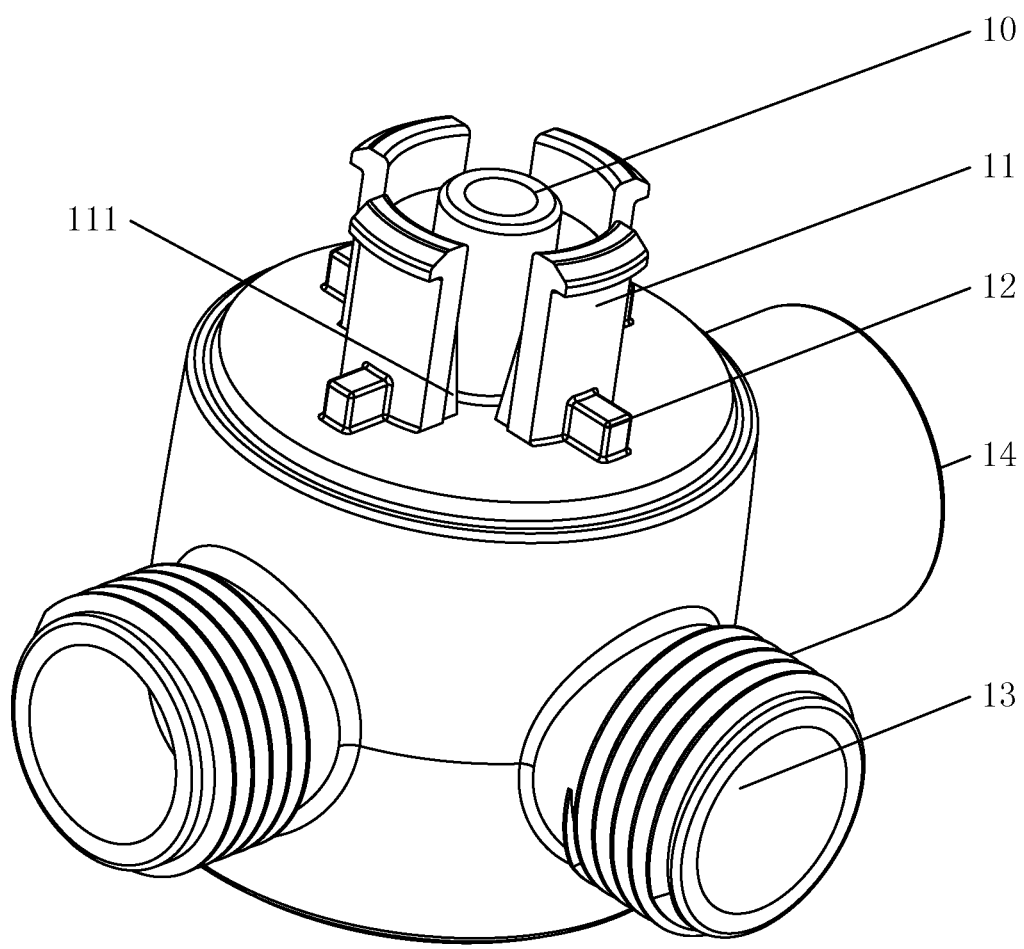
FIG. 4 is a structural diagram of the valve body of embodiment 1 of the present invention.
Figure 5:
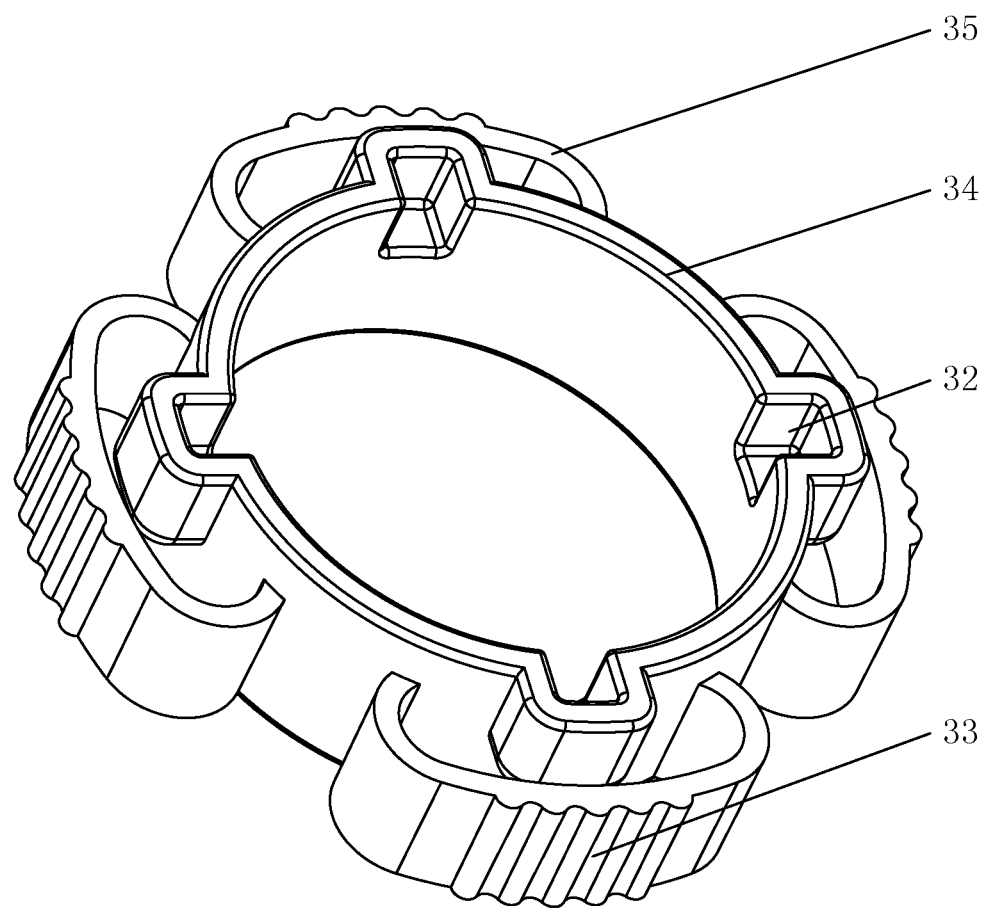
FIG. 5 is a structural diagram of the frictional unit of embodiment 1 of the present invention.
Figure 6:
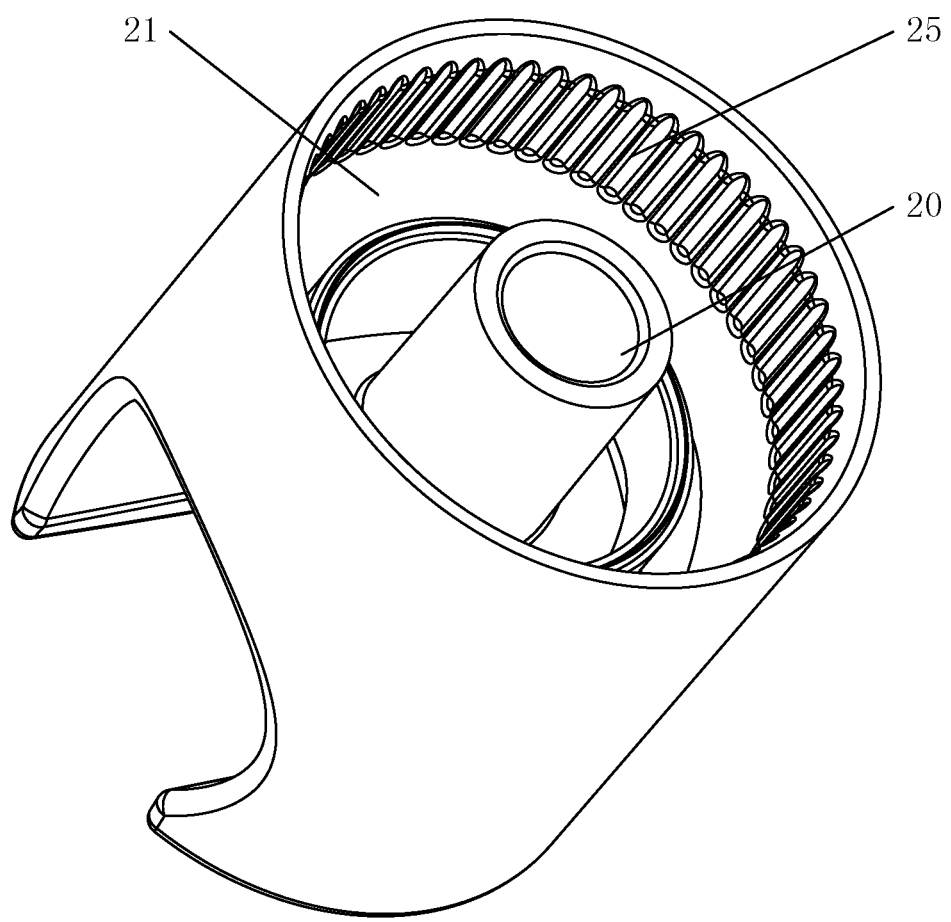
FIG. 6 is a structural diagram of the shower seat of embodiment 1 of the present invention.

As shown in FIG. 4 to FIG. 6, the outer wall of the frictional unit 3 is provided with a first tooth-like protrusion 33. The tooth crest of the first tooth-like protrusion 33 forms the first frictional surface 31. The inner wall of the connecting chamber 21 of the shower seat 2 is provided with a first tooth-like recess 25. The tooth crest of the first tooth-like recess 25 forms the second frictional surface 23. The frictional unit 3 is provided with a hollow structure, which is used to enable the tooth crest of the first tooth-like protrusion 33 to deform radially when there is relative rotation between the shower seat 2 and the valve body 1, so as to facilitate the rotation of the first frictional surface 31 relative to the second frictional surface 23. When the shower seat 2 rotates with respect to the valve body 1, the tooth crest of the first tooth-like recess 25 rotates with respect to the tooth crest of the first tooth-like protrusion 33. When the shower seat 2 rotates in place on the valve body 1, the first tooth-like recess 25 of the shower seat 2 engages with the first tooth-like protrusion 33 of the frictional unit 3. The tooth crests of the first tooth-like protrusion 33 and the first tooth-like recess 25 from pushing against each other to engaging with each other, the cooperation between the shower seat 2 and the frictional unit 3 during the process of rotation makes the user feel the shift apparently.

Particularly, the frictional unit 3 includes a fixing ring 34 and at least two "C" shape elastic elements 35. The elastic elements 35 are evenly distributed on the peripheral surface of the fixing ring 34 with even intervals and two ends thereof are fixed to the fixing ring 34. The peripheral surface of the elastic element 35 forms a circular arc wall surface on which the first tooth-like protrusion 33 is provided.

Hook heads of snap-fit joints 11, that are disposed circumferentially, are disposed outwardly. Rotation-stopping blocks 12 are disposed on the outer wall of snap-fit joints 11. Rotation-stopping grooves 32 are disposed on the fixing ring 34 of the frictional unit 3. The frictional unit 3 is connected to the valve body 1 in the following manner, i.e., rotation-stopping blocks 12 on the outer wall of snap-fit joints 11 are received in rotation-stopping grooves 32 of the fixing ring 34. When the frictional unit 3 is connected to the valve body 1 in place, the shower seat 2 is snapped to the snap-fit surface 22 on the snap-fit ring 24 through snap-fit joints 11 such that the shower seat 2 is fixed to valve body 1. At this time, the snap-fit ring 24 is located above the frictional unit 3 to prevent the frictional unit 3 from being separated from rotation-stopping blocks 12 of the valve body 1.

Embodiment 2

Figure 7:
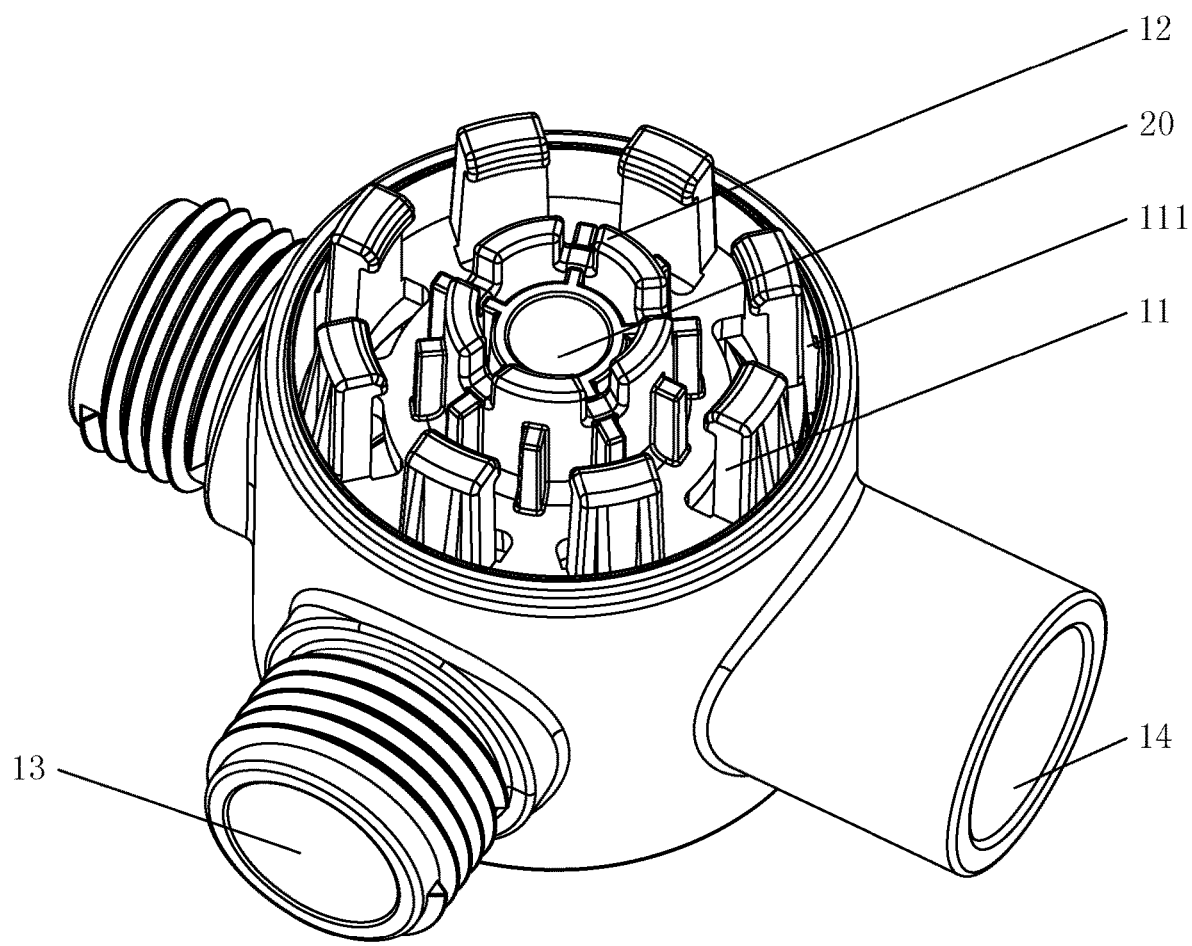
FIG. 7 is a structural diagram of the valve body of embodiment 2 of the present invention.
Figure 8:
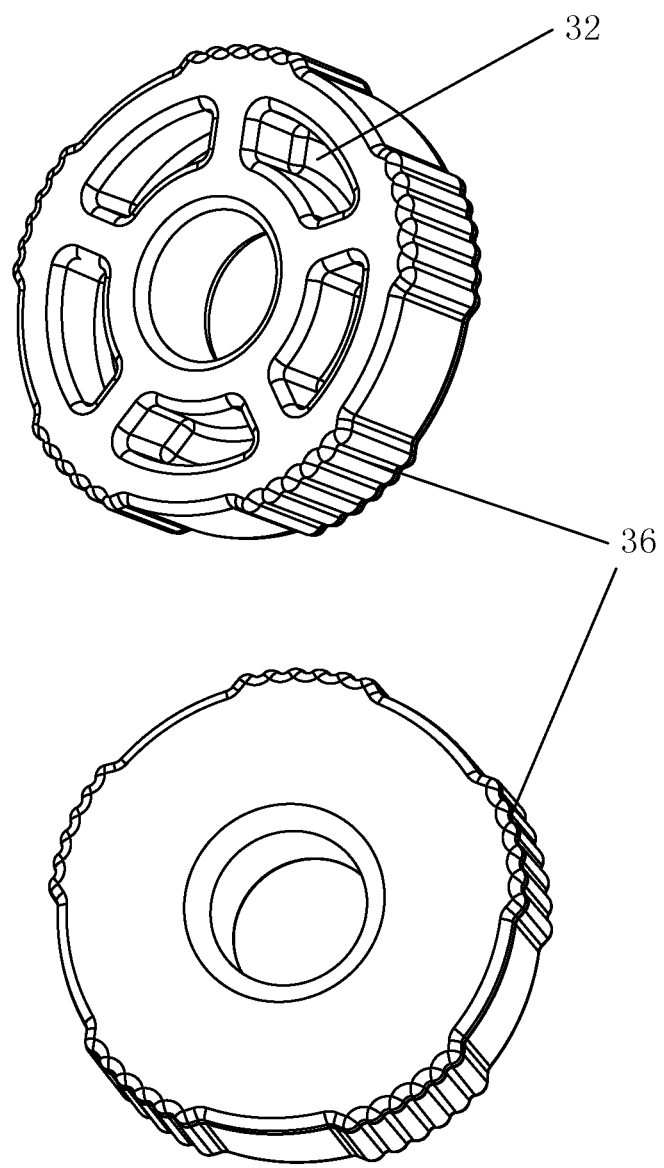
FIG. 8 is a structural diagram of the frictional unit of embodiment 2 of the present invention.
Figure 9:
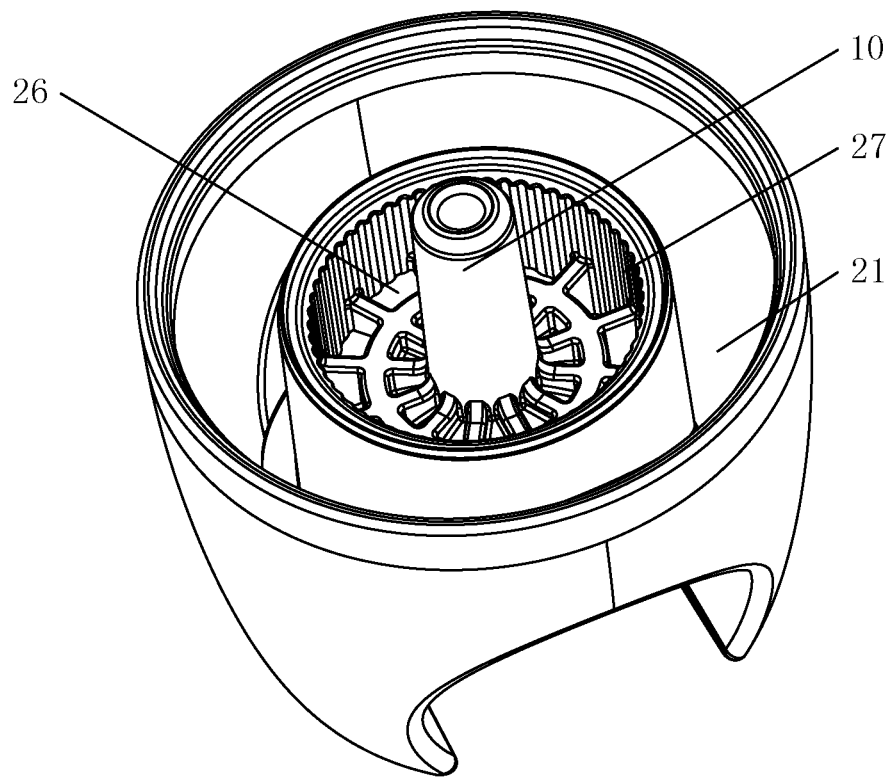
FIG. 9 is a structural diagram of the shower seat of embodiment 2 of the present invention.
Figure 10:
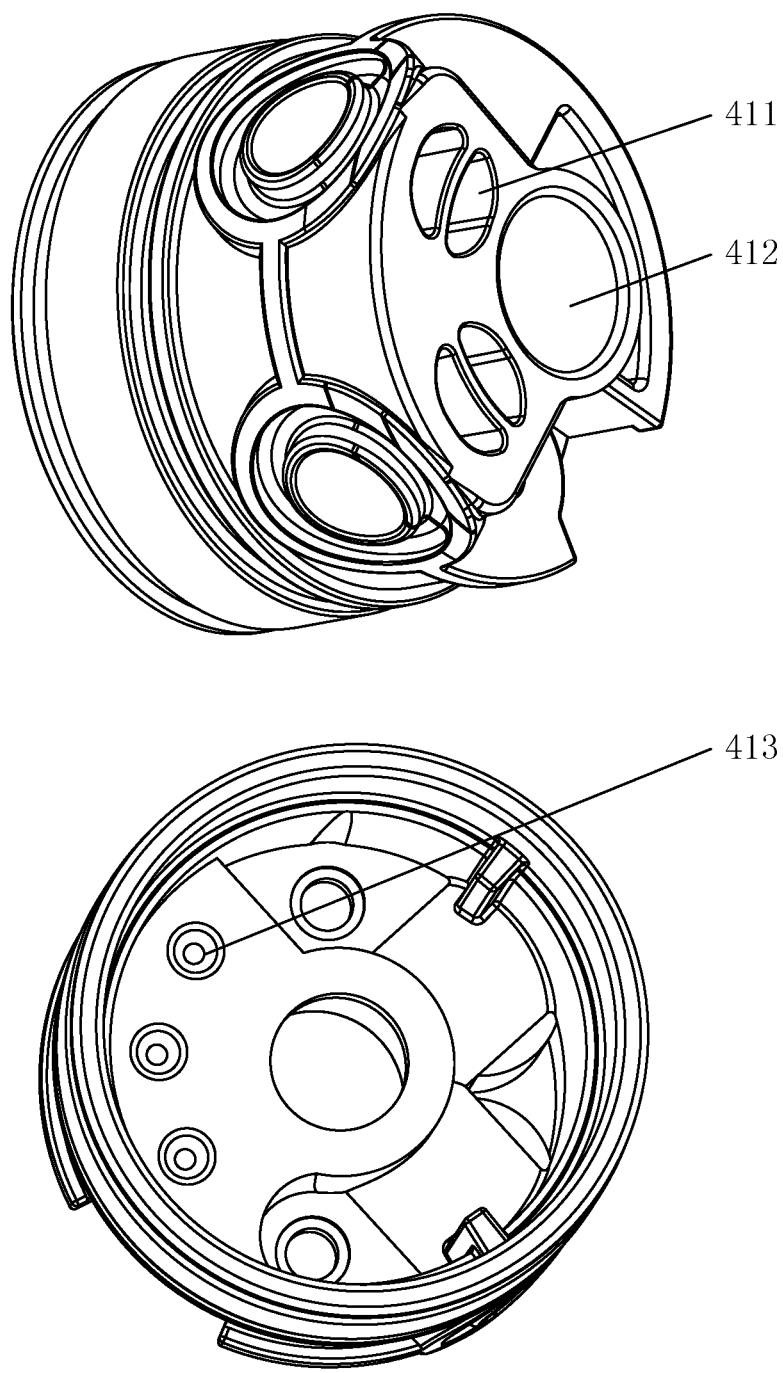
FIG. 10 is a structural diagram of the water separating body of the embodiment of the present invention.
Figure 11:
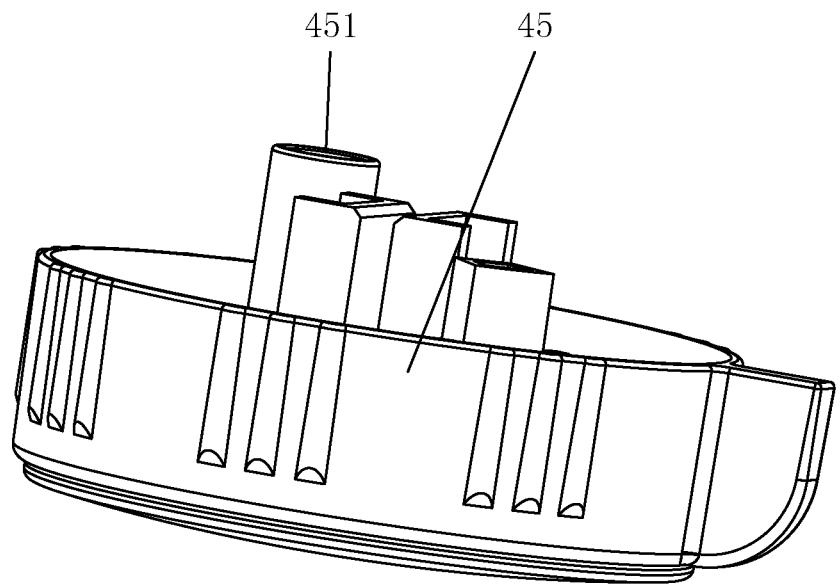
FIG. 11 is a structural diagram of the switcher structure of the embodiment of the present invention.
Figure 12:
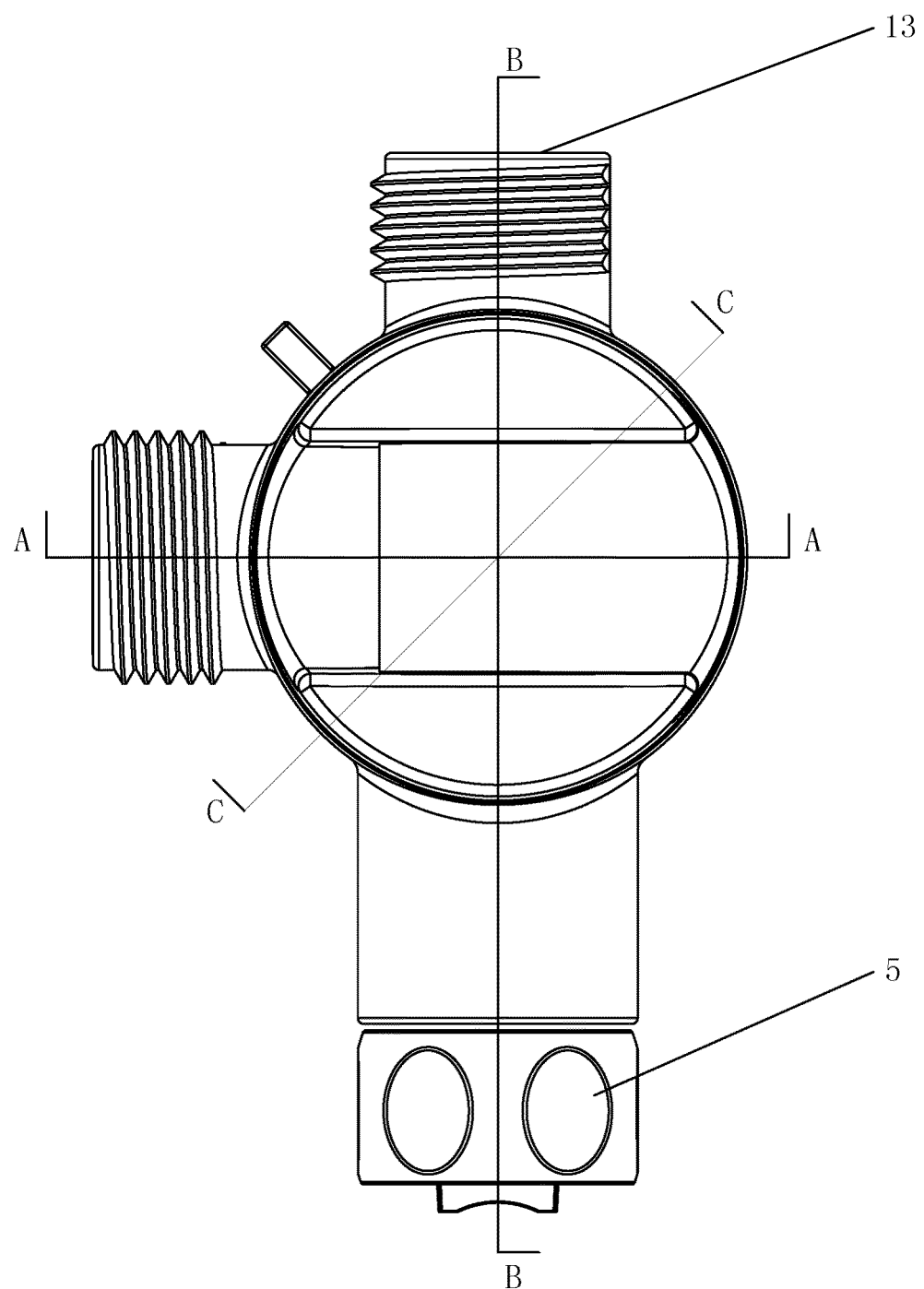
FIG. 12 is an assembly diagram of the water separator of the embodiment of the present invention.
Figure 13:
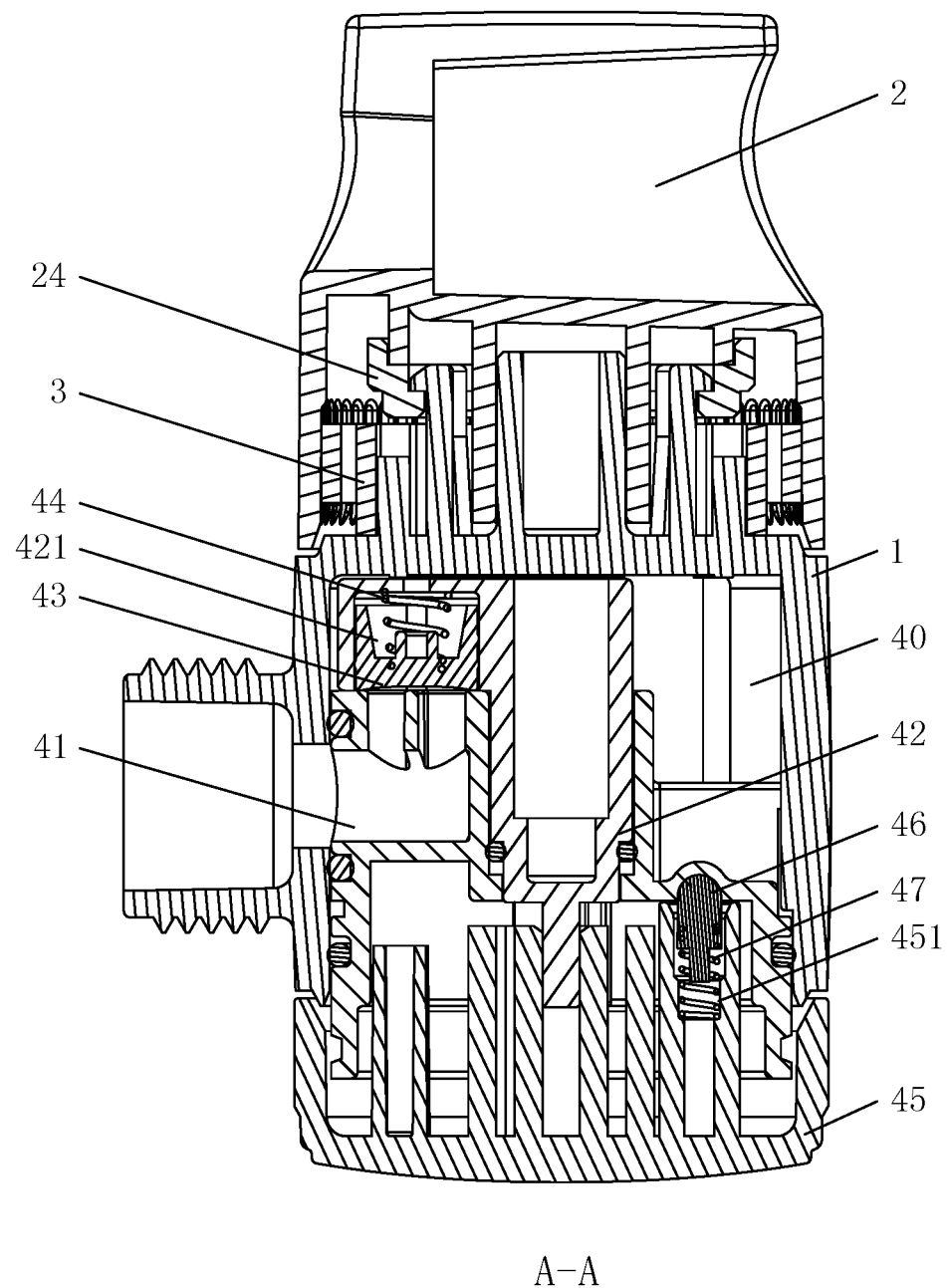
FIG. 13 is a cross sectional view of the water separator of the embodiment of the present invention taken along A-A direction.
Figure 14:
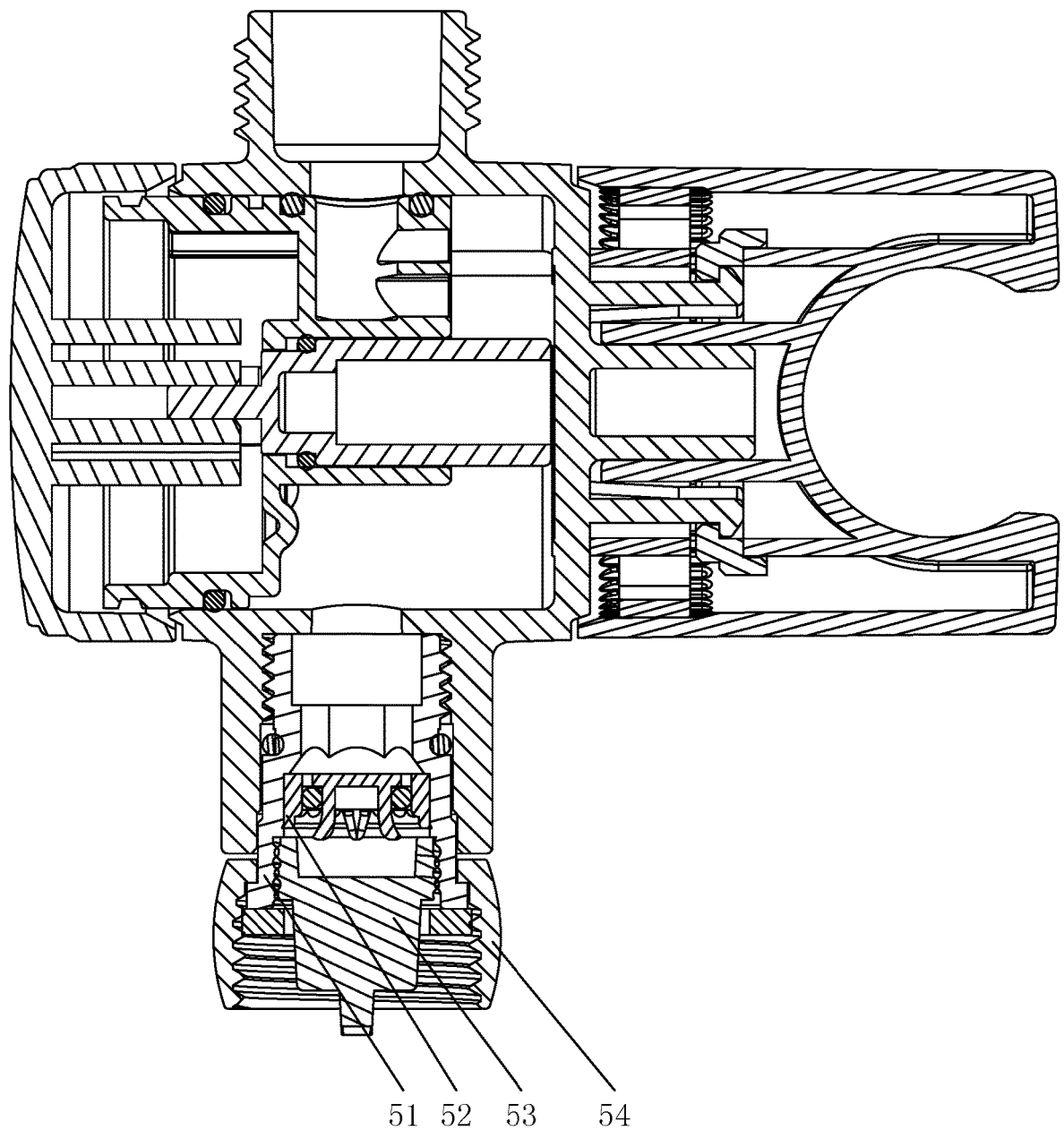
FIG. 14 is a cross sectional view of the water separator of the embodiment of the present invention taken along B-B direction.
Figure 15:
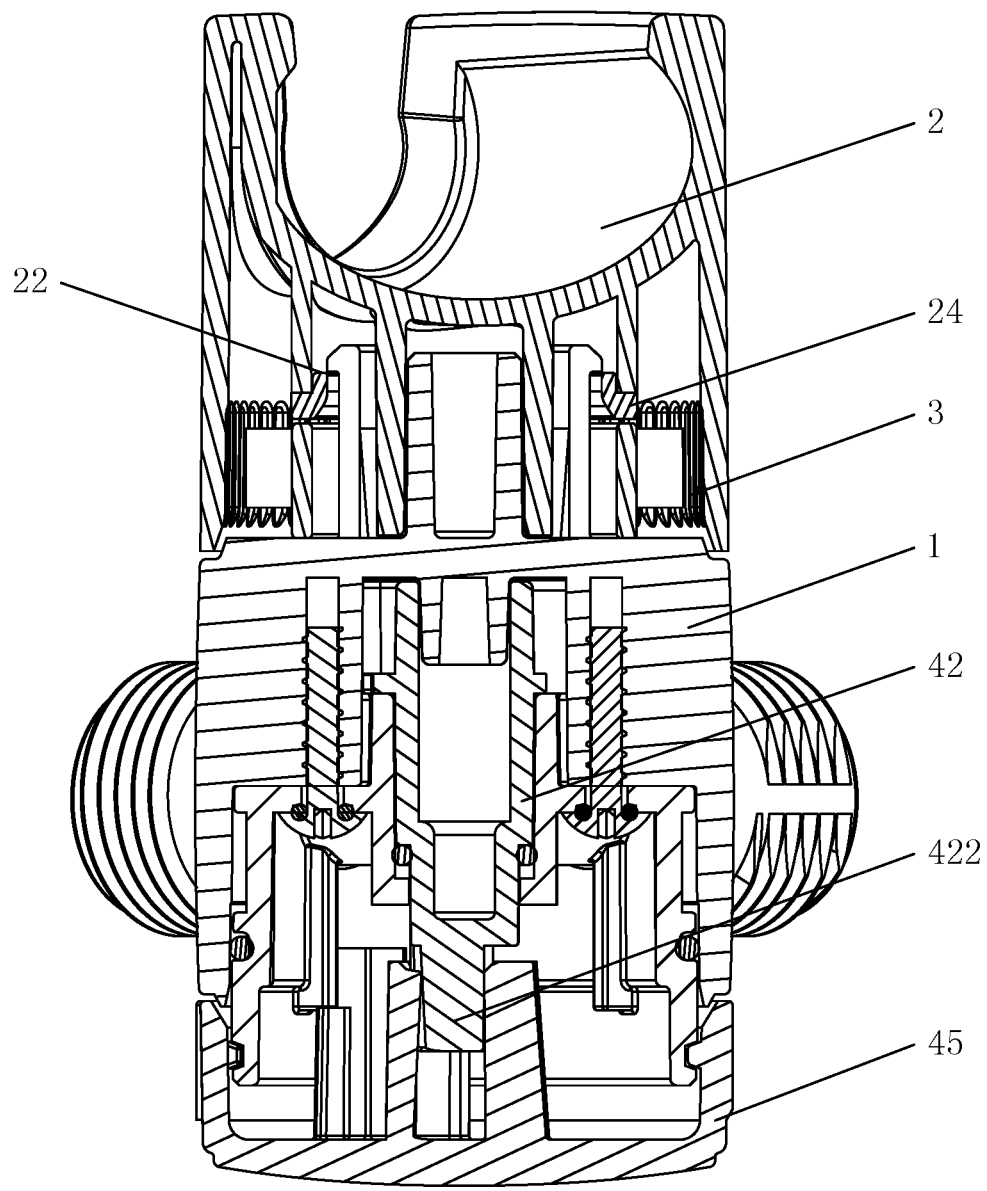
FIG. 15 is a cross sectional view of the water separator of the embodiment of the present invention taken along C-C direction.
Figure 16:
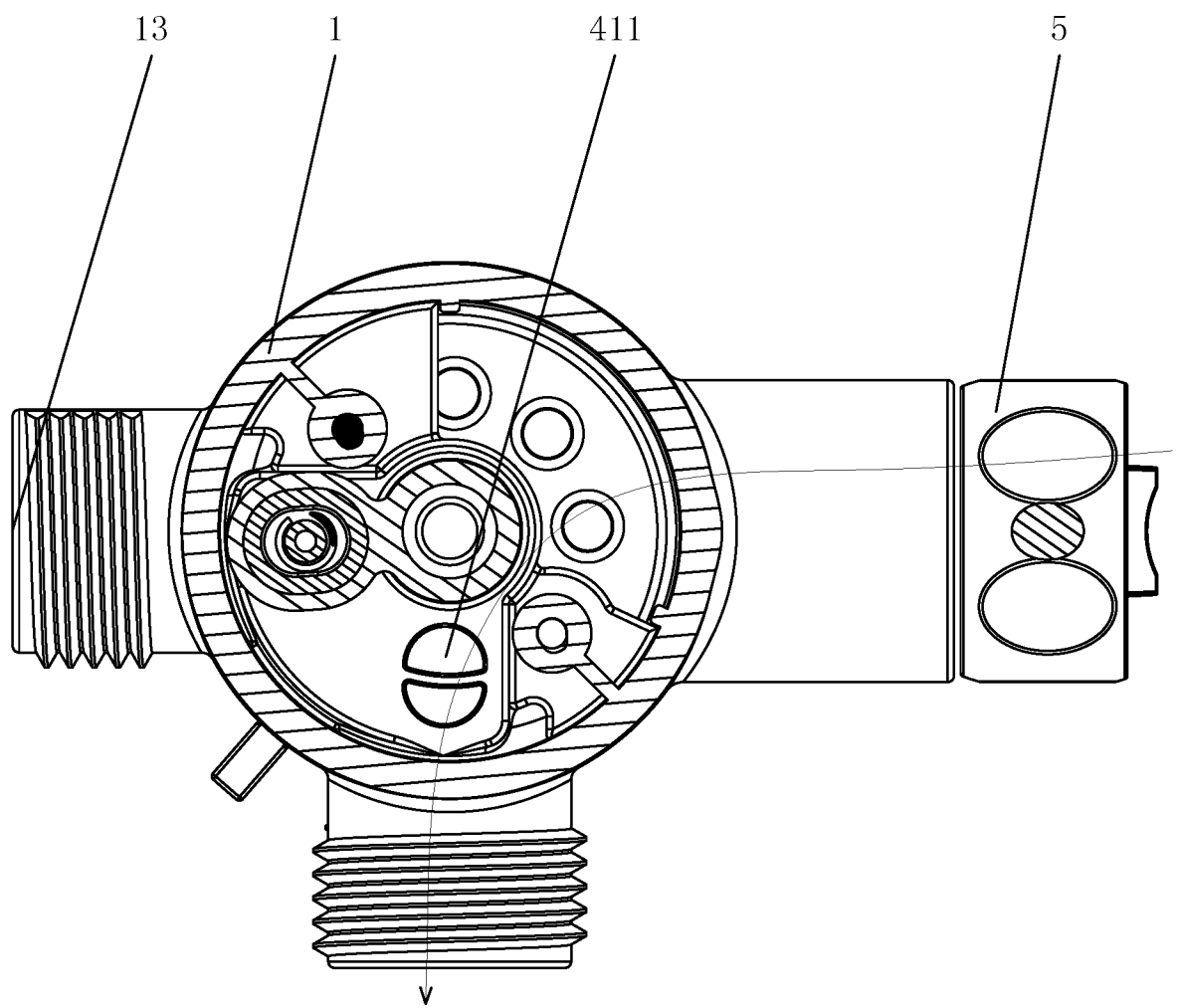
FIG. 16 is the first view of the outflow state of the water separator of the embodiment of the present invention.
Figure 17:
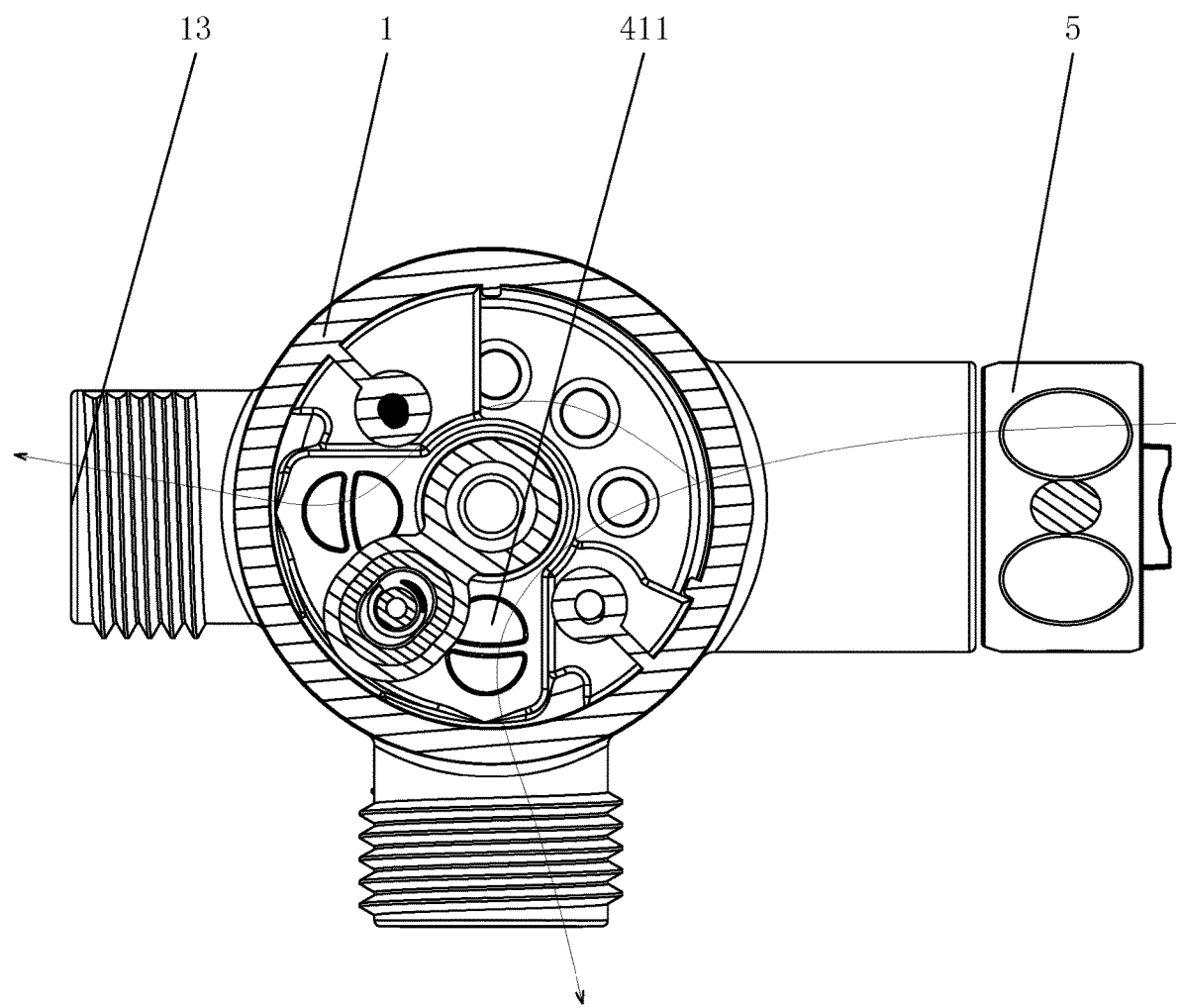
FIG. 17 is the second view of the outflow state of the water separator of the embodiment of the present invention.
Figure 18:
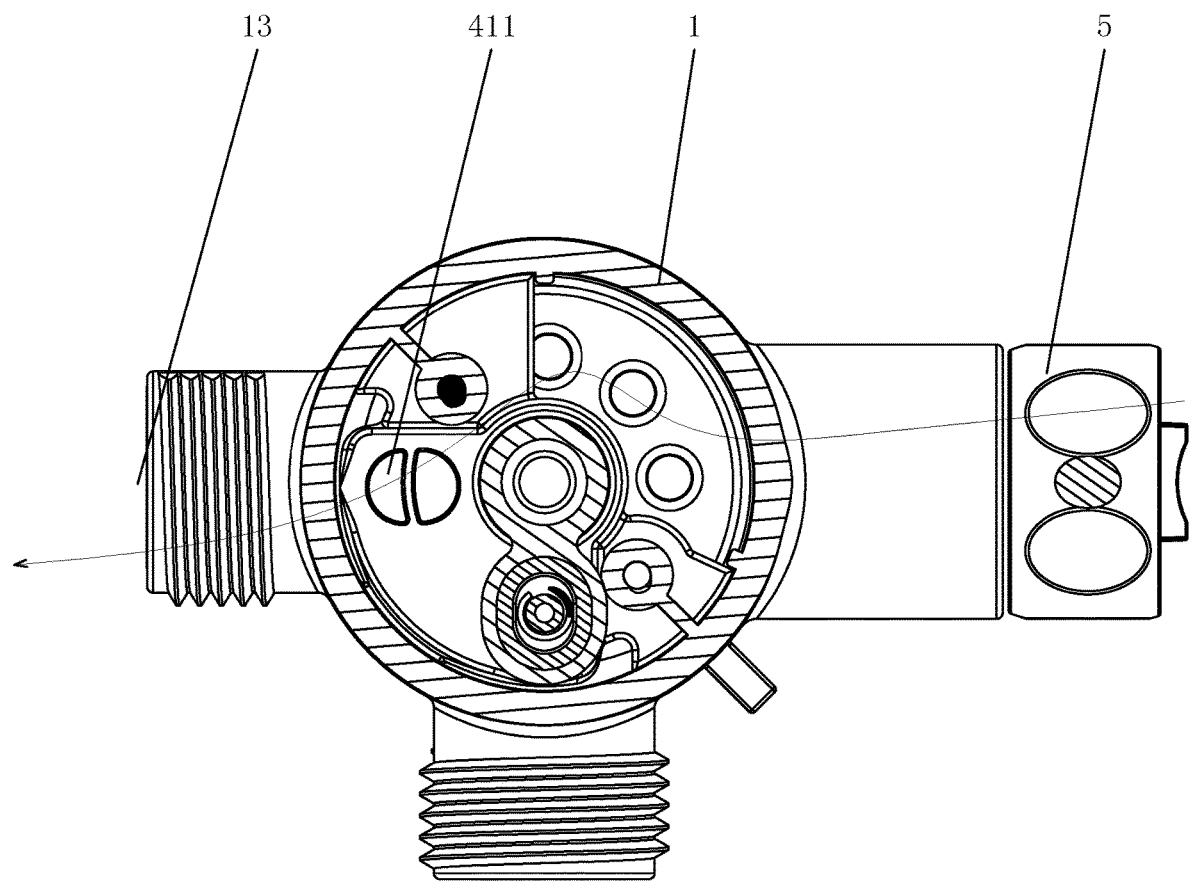
FIG. 18 is the third view of the outflow state of the water separator of the embodiment of the present invention.

As shown in FIG. 7 to FIG. 9, the outer wall of frictional unit 3 is provided with more than two second tooth-like protrusions 36. Second tooth-like protrusions 36 are circumferentially disposed on the peripheral surface of the frictional unit 3 at even intervals and the tooth crest of thereon forms the first frictional surface 31. A frictional unit receiving groove 26 is provided in the connecting chamber 21 of the shower seat 2 and the inner wall thereof is provided with a second tooth-like recess 27. The tooth crest of the second tooth-like recess 27 forms a second frictional surface 23. When the shower seat 2 rotates with respect to the valve body 1, the tooth crest of second tooth-like recess 27 rotates with respect to the tooth crest of the second tooth-like protrusion 36. When the shower seat 2 rotates in place on the valve body 1, the second tooth-like recess 27 on the inner wall of the frictional unit receiving groove 26 engages with the second tooth-like protrusion 36 on the peripheral surface of the frictional unit 3. The tooth crest of the second tooth-like protrusion 36 and the second tooth-like recess 27 from pushing against each other to engaging with each other, the cooperation between the shower seat 2 and the frictional unit 3 during the process of rotation makes the user feel the shift apparently.

Particularly, hook heads of the circumferentially disposed snap-fit joints 11 are disposed inwardly. The snap-fit ring 24 is either fixed to the outer wall or the open end of the frictional unit receiving groove 26 in the connecting chamber 21 of the shower seat 2 to form a step together with the outer wall of the frictional unit receiving groove 26. The surface of the step forms the snap-fit surface 22 as described above. The fixation of the shower seat 2 to the valve body 1 is achieved by snapping snap-fit joints 11 of the valve body 1 to the snap-fit surface 22 of the step. At this time, snap-fit joints 11 of the valve body 1 are snapped to the periphery of the frictional unit receiving groove 26.

Further, in embodiments 1 and 2, reinforcing ribs 111 are provided on snap-fit joints 11 and located on the side which is opposite to the hook head of snap-fit joints 11 to increase the strength of snap-fit joints 11, and thus ensure the structural stability when the shower seat 2 is mounted to the valve body 1 in place.

Particularly, in the present invention, snap-fit joints 11 and the frictional unit 3 can be designed as a structure respectively integrated with the valve body 1 to increase the strength of snap-fit joints 11 and the frictional unit 3 such that the structural stability is increased and the connection strength of the shower seat 2 and the valve body 1 is increased. In the embodiments of the present invention, particularly, a connecting hole 20 is provided either on the valve body 1 or on the connecting chamber 21 of the shower seat 2, and a connecting rod 10 rotatably inserting through the connecting hole 20 is provided on the other. By rotatably inserting the connecting post 10 in the connecting hole 20, the positioning connection between the shower seat 2 and the valve body 1 is realized, the structural stability of the connection between the shower seat 2 and the valve body 1 is ensured, and the connection strength is improved.

In the present invention, the water outflow switching mechanism 4 includes a water separating body 41, a valve core 42, a leather cup 43 and an elastic member 44. The circumferential wall of the valve body 1 is provided with at least one water outlet 13. The water separating body 41 is mounted in the valve body 1 and a closed water cavity 40 is formed between the water separating body 41 and the valve body 1. The water separating body 41 is provided with a water separating hole 411 corresponding to and connecting with the water outlet 13.

The water separating body 41 is provided with an inserting hole 412 into which the valve core 42 can be inserted. Particularly, the valve core 42 has a cylindrical structure and is provided on the peripheral surface thereof with a leather cup hole 421 with the opening aperture facing downwardly. The leather cup 43 is mounted in the leather cup hole 421 and a cavity is formed between the leather cup 43 and the leather cup hole 421 for receiving the elastic member 44. One end of the elastic member 44 abuts against the leather cup 43. When the valve core 42 is mounted in place on the water separating body 41, the elastic member 44 presses against the leather cup 43 to make the leather cup 43 abut a surface of the water separating body 41 where the water inflow end of each water separating hole locates. When the valve core 42 is driven to rotate, the drive leather cup 43 rotates accordingly and blocks each of the water separating hole 411 alternately.

More particularly, the water outflow switching mechanism 4 further includes a shifter 45 mounted on the lower end of the water separating body 41. The lower end of the valve core 42 extends downward and forms thereon a converting portion 422. The converting portion 422 passes through the inserting hole 412, extends beyond the bottom of the inserting hole 412 and is connected to the shifter 45. Since the converting portion 422 of the valve core 42 is connected to the shifter 45, when the shifter 45 is driven to rotate, the valve core 42 rotates accordingly and in turn drives the leather cup 43 on the valve core 42 to block or open the water separating hole 411 alternatively.

More particularly, a steel ball 46 and a torsion spring 47 are disposed between the shifter 45 and the water separating body 41. A locating hole 451 is provided on the side of the shifter 45 connected with the water separating body 41. The torsion spring 47 is disposed in the locating hole 451 and one end thereof pushes against the steel ball 46. The water separating body 41 is provided with at least two locating grooves 413. The number of the locating grooves 413 is no less than that of the water separating hole 411. When the shifter 45 is driven to rotate, the drive leather cup 43 on the valve core 42 is accordingly driven to block the water inflow end of the corresponding water separating hole 411. At this point, the steel ball 46 rotates into the locating groove 413 corresponding to the water separating hole 411 to guarantee the shift. More particularly, in the present embodiment, the valve body 1 is provided with two water outlets 13 corresponding to two water separating holes 411 provided on the water separating body 41. The water separating body 41 is provided with three locating grooves 413, which are used to secure the shift from alternatively blocking the two water separating holes 411 to opening both of the two water separating holes 411.

The water inflow mechanism 5 is connected to the water inlet 14 provided on the circumferential wall of the valve body 1 and includes a connecting unit 51, a flow limiter 52, a filter element 53 and a locking member 54. The flow limiter 52 is mounted in the connecting unit 51. The connecting unit 51 is in a threaded connection with the water inlet 14 which is on the wall of the valve body 1. The filter element 53 is mounted at the water inlet of the connecting unit 5. The locking member 54 is snapped to the water inlet of the connecting unit 51, such that the filter element 53 is fixedly connected to the connecting unit 51.

In the assembly process, sealing elements are provided between the valve body 1 and the water separating body 41, between the water separating body 41 and the shifter 45, and between the valve body 1 and the water outflow mechanism 5, respectively, to ensure the sealing effect of the water separator to avoid leakage.

During the outflow of water, the water flows from the water inflow mechanism 5, via the water inlet 14 of the valve body 1, into the water cavity 40. The shifter 45 is driven to rotate and drives the valve core 42 to rotate such that the leather cup 43 on the valve core 42 does not block water separating holes 411 of the water separating body 41 or only block one of the water separating holes 411. The water flows through the water separating hole 411 and out of the corresponding water outlet 13 of the valve body 1.

In the present invention, since the shower seat is snapped on the valve body, the connection between the shower seat and the valve body is improved as compared to conventional structure, where the shower seat and the valve body were locked to each other by screw. Thus, the risk of detachment, dropping, etc., of shower due to loosening of the screw during the rotation of the shower seat is avoided.

By using the rotation-stopping block fixed to the valve body and the rotation-stopping groove disposed on the frictional unit to determine the relative position between the frictional unit and the valve body and prevent the circumferential rotation of the frictional unit with respect to the valve body, the anti-rotation of the frictional unit with respect to the valve body is achieved by a simple structure. Therefore, the assembly is simple and easy to realize.

The snap-fit surface of the shower seat is formed by the upper surface of the snap-fit ring fixed in the connecting chamber, and the snap-fit ring and the shower seat are separate structures such that the manufacturing process of the shower seat is much easier and the demolding is easily achieved in the molding process of the shower seat. Furthermore, the structure of the snap-fit surface is simple and reliable.

The rotational fit between the first tooth-like protrusion and the first tooth-like recess is used to achieve frictional rotation between the shower seat and the valve body such that the user can apparently feel the shift. The conventional structure, in which the rotation is stopped by rigid friction, is avoided. Since the frictional unit is provided with a hollow structure that enables the first tooth-like protrusion to radially deform during rotation, when the shower seat rotates with respect to the valve body, no large external force is required. Therefore, the operation is more convenient.

Since the "C" shape peripheral surface of the elastic element has a certain ability of deformation, the shower seat does not wear easily even after long time rotation to ensure that the rotating torque of the shower seat will not decrease even after long-time use and ensure the effectiveness and convenience of the rotation and anti-rotation of the shower seat. The connection of the fixing ring to the valve body is simple and easy to achieve.

The rotational fit between the second tooth-like protrusion and the second tooth-like recess is used to achieve frictional rotation between the shower seat and the valve body, such that the user can apparently feel the shift. The conventional structure, in which the rotation is stopped by rigid friction, is avoided. Therefore, the operation is more convenient. The rotating torque of the shower seat will not decrease during long-time use.

The frictional unit receiving groove is provided in the connecting chamber of the shower seat and the frictional unit is mounted in the frictional unit receiving groove such that the stability of the frictional unit during the rotation of the shower seat is improved. Therefore, the connection is more reliable.

The configuration of the reinforcing rib increases the structural strength and stability, avoiding the risk that the shower seat or the shower may get loose or dropped due to the insufficient strength of the snap-fit joints when the shower is suspended on the shower seat and water outflows of the shower.

The snap-fit joints and the frictional unit are integrated with the valve body, ensuring the stability of the snap-fit joints and the frictional unit, such that the strength of the installation structure of the shower seat is guaranteed. The following situation is avoided, i.e., after the shower seat is connected to the valve body, the suspension and water outflow of the shower may cause the detachment of the snap-fit joints from the valve body, thus making the connection unreliable.

In the water outflow switching mechanism, the rotation of the valve core drives the leather cup to switch and block the water separating hole respectively. During the switching of water flow, all water separating holes will not be blocked at the same time, ensuring the stability of the inner water pressure of the valve body.

In the water outflow switching mechanism, the water outflow switching function is achieved in a rotational manner. The rotational movement of the valve core is tangential to the direction of the water flow. The water outflow does not pass through the leather cup. Therefore, the force required for switching the water outflow is relatively small and the operation is relatively convenient.

In the water outflow switching mechanism, the valve core is driven to rotate, the leather cup is linked to rotate and block or open the water separating hole alternately, thus the linkage structure is simple.

In the water inflow mechanism, the flow limiter is adopted to ensure the water saving performance of the water separator. The filter element is provided at the water inflow end of the connecting unit to remove the impurities in water. Therefore, the quality of water flow is ensured, further avoiding the impurities in water from blocking the water outlet of the water separator or affecting the performance of other components.

The foregoing description describes preferred embodiments of the present invention, but it is to be understood that the present invention is not limited to the above-described embodiments and should not be construed as an exclusion of other embodiments. Using the present invention, the modification made by those skilled in the art in conjunction with known or prior art should also be considered within the scope of protection of the present invention.

We claim:

1. A water separator with a shower seat, comprising:
a valve body provided with a plurality of snap-fit joints disposed circumferentially;
a frictional unit mounted on the valve body, wherein an outer peripheral wall of the frictional unit comprises a first frictional surface;
a shower seat provided with a connecting chamber, wherein the connecting chamber has an open end; and
a water outflow switching mechanism mounted in the valve body, wherein the water outflow switching mechanism comprises an elastic member; wherein
the connecting chamber is provided with a snap-fit surface disposed circumferentially, and an inner peripheral wall of the connecting chamber comprises a second frictional surface disposed circumferentially;
hook heads of the plurality of snap-fit joints are snapped to the snap-fit surface to prevent the shower seat from getting separated from the valve body; and
the first frictional surface and the second frictional surface rotate accordingly and interact with each other when the shower seat rotates with respect to the valve body.

2. The water separator with the shower seat according to claim 1, wherein
each of the plurality of snap-fit joints is provided with a reinforcing rib located on a side that is opposite to the respective hook head.

3. The water separator with the shower seat according to claim 1, wherein the plurality of snap-fit joints and the frictional unit are integrated with the valve body respectively.

4. The water separator with the shower seat according to claim 1, wherein
a wall of the valve body is provided with at least one water outlet;
the water outflow switching mechanism further comprises
a water separating body, wherein the water separating body comprises at least one water separating hole corresponding to the at least one water outlet of the valve body;
a valve core rotatably mounted on the water separating body, wherein the valve core comprises a leather cup hole; and
a leather cup, wherein
the water separating body is mounted in the valve body and a closed water cavity is formed between the water separating body and the valve body;
the leather cup and the elastic member are mounted in the leather cup hole;
one end of the elastic member pushes against the leather cup such that the leather cup presses against a surface of the water separating body, wherein a water inflow end of each of the at least one water separating hole is located at the surface of the water separating body; and
the valve core is driven to rotate such that the leather cup is switched to alternately block the at least one water separating hole.

5. The water separator with the shower seat according to claim 4, further comprising
a water inflow mechanism;
wherein the wall of the valve body is provided with a water inlet,
wherein the water inflow mechanism comprises
a connecting unit fixedly connected to and communicating with the water inlet, wherein the connecting unit comprises a plurality of threads;
a flow limiter mounted in the connecting unit; and
a filter element mounted at a water inflow end of the connecting unit.

6. The water separator with the shower seat according to claim 1, wherein
the valve body is provided with at least one rotation-stopping block;
the frictional unit is provided with at least one rotation-stopping groove corresponding to the at least one rotation-stopping block; and
the at least one rotation-stopping block is inserted in a respective one of the at least one rotation-stopping groove to prevent the frictional unit from rotating with respect to the valve body.

7. The water separator with the shower seat according to claim 6, wherein
a snap-fit ring is fixed in the connecting chamber of the shower seat and an upper end surface of the snap-fit ring forms the snap-fit surface.

8. The water separator with the shower seat according to claim 7, wherein
the outer peripheral wall of the frictional unit is provided with more than two second tooth-like protrusions circumferentially disposed on a peripheral surface of the frictional unit at even intervals, and tooth crests of the more than two second tooth-like protrusions form the first frictional surface;
a frictional unit receiving groove is provided in the connecting chamber of the shower seat;
an inner wall of the frictional unit receiving groove is provided with a second tooth-like recess and tooth crests of the second tooth-like recess form the second frictional surface;
the tooth crests of the second tooth-like recess rotate with respect to the tooth crests of the more than two second tooth-like protrusions, when the shower seat rotates with respect to the valve body;
the second tooth-like recess engages with the more than two second tooth-like protrusions, when the shower seat rotates in place;
hook heads of the snap-fit joints disposed circumferentially are disposed radially inwardly;
the plurality of snap-fit joints are snapped to the snap-fit surface on the periphery of the frictional unit receiving groove such that the shower seat is connected to the valve body.

9. The water separator with the shower seat according to claim 7, wherein
the outer peripheral wall of the frictional unit is provided with at least one first tooth-like protrusion and
a tooth crest of the at least one first tooth-like protrusion forms the first frictional surface;
the inner peripheral wall of the connecting chamber of the shower seat is provided with a first tooth-like recess and
a tooth crest of the first tooth-like recess forms the second frictional surface;
the frictional unit is provided with a hollow structure such that the tooth crest of the at least one first tooth-like protrusion deforms radially when the shower seat rotates with respect to the valve body so as to facilitate the rotation of and the interaction between the first frictional surface and the second frictional surface; and
the at least one first tooth-like protrusion engages with the first tooth-like recess when the shower seat rotates in place.

10. The water separator with the shower seat according to claim 9, wherein
the frictional unit comprises a fixing ring and at least two C-shape elastic elements distributed on a peripheral surface of the fixing ring at even intervals with two ends of each of the at least two C-shape elastic elements fixed to the peripheral surface of the fixing ring;
the at least one first tooth-like protrusion is disposed on a periphery of each of the at least two C-shape elastic elements;
the hook heads of the plurality of snap-fit joints disposed circumferentially are disposed radially outwardly;
each of the at least one rotation-stopping block is disposed on an outer periphery of a respective one of the plurality of snap-fit joints and
the at least one rotation-stopping groove is provided on the fixing ring, wherein
the at least one rotation-stopping block of the plurality of snap-fit joints is received in the respective one of the at least one rotation-stopping groove of the fixing ring, such that the frictional unit is connected to the valve body.

* * * * *